United States Patent [19]

Winzen et al.

[11] Patent Number: 4,875,716
[45] Date of Patent: Oct. 24, 1989

[54] JOINTED PIPE CONNECTION, PARTICULARLY FOR AUTOMOTIVE EXHAUST PIPES

[75] Inventors: Wilfried Winzen, Pforzheim; Manfred Wünschmann, Neuenburg, both of Fed. Rep. of Germany

[73] Assignee: Witzenmann GmbH Metallschlauch-Fabrik Pforzheim, Pforzheim, Fed. Rep. of Germany

[21] Appl. No.: 12,847

[22] Filed: Feb. 10, 1987

[30] Foreign Application Priority Data

Mar. 29, 1986 [DE] Fed. Rep. of Germany ....... 3610684

[51] Int. Cl.⁴ .............................................. F16C 27/10
[52] U.S. Cl. .................................. 285/137.1; 285/226
[58] Field of Search ................ 285/49, 226, 223, 299, 285/302, 301, 227, 228, 137.1; 403/51

[56] References Cited

U.S. PATENT DOCUMENTS

| 2,712,456 | 7/1955 | McCreery | 285/226 X |
| 3,656,784 | 4/1972 | Dow et al. | 285/302 X |
| 3,693,999 | 9/1972 | Wood, Jr. | 403/51 X |
| 4,350,372 | 9/1982 | Logsdon | 285/226 X |
| 4,659,117 | 4/1987 | Holzhausen et al. | 285/49 |

FOREIGN PATENT DOCUMENTS

| 60112 | 12/1891 | Fed. Rep. of Germany | 285/226 |
| 835378 | 3/1952 | Fed. Rep. of Germany | 285/226 |
| 2838990 | 3/1980 | Fed. Rep. of Germany . |
| 2912347 | 10/1980 | Fed. Rep. of Germany . |
| 3321382 | 2/1984 | Fed. Rep. of Germany . |
| 3524931 | 2/1986 | Fed. Rep. of Germany . |
| 2419393 | 10/1979 | France . |
| 2451456 | 10/1980 | France . |
| 1507417 | 4/1978 | United Kingdom | 285/302 |

Primary Examiner—Thomas F. Callaghan
Attorney, Agent, or Firm—Frishauf, Holtz, Goodman & Woodward

[57] ABSTRACT

A jointed connection for pipes, especially motor vehicle exhaust pipes (9, 10), features a flexible surrounding conduit element (3, 103, 117) and a support member (11, 12; 105, 116, 130, 145, 146, 157) which connects the pipes through support pads (13, 14; 109; 121, 133, 143, 144, 160) in a load-bearing but angularly flexible and elastically damped manner. An inner protective tube (7, 8; 104; 114; 127, 128; 141, 142; 156) is attached to the pipe not attached to the support member, and the support pads are radially confined between the support element and the inner protective tube. The support pads are also axially engaged with the inner protective tube and the support member, or with additional elements (107, 131) attached thereto. The result is a structure which is compact, yet provides flexibility and elastic damping while protecting from corrosion the elements responsible for the flexibility and elasticity.

25 Claims, 7 Drawing Sheets

JOINTED PIPE CONNECTION, PARTICULARLY FOR AUTOMOTIVE EXHAUST PIPES

The present invention relates generally to jointed connections for pipes, and more particularly, to motor vehicle exhaust pipes, which may be at an angle to the exhaust output of the internal combustion engine.

BACKGROUND

German Patent DE-PS 28 38 990 and German patent disclosure document DE-OS 33 21 382 describe exhaust pipe connections which allow relative motion between the engine and the exhaust pipe, and provide elastic damping of the relative motion.

In these structures, the elastically damping connecting elements, which seek to maintain the pipes and their terminals in a middle position in the conduit, are disposed outside of the conduit, where they are subjected to corrosive influences and are subject to damage. They require projecting support members, with correspondingly large moments of inertia, and this necessitates sturdier and heavier construction of the components. In short, such structures are bulky, difficult to assemble, and susceptible to damage.

THE INVENTION

It is an object of the present invention to so alter the previous construction of the jointed connection that elastically damping connecting elements are removed from corrosive influences and external risks of structural damage, that the forces acting on the connecting elements are brought closer to the axis of the enclosing conduit, and that, in general, a more elegant, easy-to-assemble, and compact construction results. Further, the conduit, to which heretofore the gas stream has had free access, should be shielded to the maximum extent possible, and components which are already present in the structure should increase their utility by serving additional functions.

Briefly, the joint connection of the present invention has an inner protective tube with a free end surrounded by an annular support pad. The pad is surrounded by a support member, and is supported axially at the ends by the inner protective tube and/or the support member.

The basic principle of the invention is to dispose an elastically damping connecting element centrally symmetrically to the flow path between the two pipes being connected, and to form this connecting element partly from the inner protective tube. By interposing a resilient pad between the free end of the inner protective tube and the other pipe, the tube can be supported from both ends.

The functions served by the inner protective tube are thus expanded, and the need for an additional component to serve as an elastically damping connecting element is dispensed with. Since, further, this arrangement of the connecting element centrally symmetrically and closer to the axis of the flow path dispenses with projecting arms, the terminal elements can be made with substantially thinner walls, preferably as stampings, so that this feature and other structural features of the connecting elements require less material and result in substantially more economical construction.

The structure of the present invention also achieves a decoupling of the gas stream from the inner surface of the conduit element, which reduces heat loading and corrosion loading on the conduit element. Further, since the pulsating pressure fluctuations of the gas stream no longer reach the inner surface of the conduit element, the latter is sonicly decoupled from the gas stream and its noise emissions are reduced.

According to a first, fundamental embodiment of the invention, the conduit and the support member can both extend from one pipe or its terminal, with the support member inside the conduit. These features have the result that the elastically damping connecting element, now disposed inside the conduit, is removed from influences external to the conduit, and also no longer represents a protruding element, so the jointed connection of the invention represents a flat, elegant, compact unit closed off by the conduit.

In this context, it is useful for the support pad to be disposed around the free portion of the length of the inner protective tube. By this means, the support pad is held on the radially inward side by the inner protective tube, on the radially outward side by the support member, and in both axial directions, on one side by the inner protective tube and on the other by the support member, so that the support pad sits practically in an annular chamber defined by the inner protective tube and the support member.

The embodiment described thus far is a single-stream structure for one flow path, which with the help of the inner protective tube features the elastically damping connecting element disposed within the conduit element. Now, it frequently occurs in the exhaust systems of motor vehicles that multiple flow paths run next to each other, typically from a common terminal. If one were to place several of the structures described above next to one another, the result would be a corresponding requirement for space and it would pose technical difficulties, particularly in attaching multiple parallel conduits, so that these could not be welded or otherwise connected to the pipes or terminals in a single working step.

Therefore, in further developing the inventive concept, it is particularly desirable if multiple flow paths can be commonly surrounded by one conduit and connected in this manner to the terminal(s). In this manner, the multiple flow paths and their respective connecting elements can be tightly packed together and encompassed by one conduit element, which not only leads to a substantially compacter structure, but, above all, raises the possibility of connecting the conduit element in a single working step to the terminals, which results in a substantial saving of material and assembly effort.

Further, the structure of the present invention, with a connecting element associated with each flow path, keeps the individual flow paths separate without a conduit between them, and no pressure fluctuations are transmitted from one flow path to another flow path. Thus, in this respect, the common, all encompassing conduit element poses no difficulties or hindrances.

In connection with the foregoing, it can be useful for the cross-section of the conduit element to be substantially an arc drawn around the adjacent flow paths or the components forming them. With a two-stream conduit, the cross-section of the conduit advantageously corresponds to an oval, and the conduit is therefore configured as an oval bellows.

Even for the foregoing embodiments of the inventive construction, close construction relationships due to the required cross-sections can result in difficulties, so that an even slenderer structure is desirable, whose space requirement corresponds practically only to that of a normal conduit, without giving up any of the advantages already achieved.

A second fundamental embodiment of the inventive structure features a conduit element which is connected with the end of the support member remote from the other pipe, and an inner protective tube whose length extends beyond that of the conduit element and whose free end projects into the support member to form the flexible connection.

By these features, the arrangement of the support pads axially adjacent to the conduit element is avoided, so that an enlargement of the radial cross-section of the structure due to the support pads is not required, despite the fact that the shielding of the conduit from the gas stream is maintained, the support pad is fully encapsulated and removed from external influences, and the inner protective tube remains integrated into the structure of the connecting element. By giving the inner protective tube these additional functions, a corresponding dedicated component can still be dispensed with.

If multi-stream conduits are used here, for example in exhaust systems of motor vehicles, it is advantageous for further saving of space that the multi-stream conduits have a common conduit element which surrounds the adjacent flow paths and connects the pipes, that the conduit be connected on both sides with a terminal plate having an opening for each flow path, one plate being fastened to the end of the associated pipes, perhaps with the ends of the inner protective tubes interposed, the other plate being fastened to the free ends of the associated support members. The support members can also be integrated to a single element encompassing the adjacent flow paths, so that altogether a very compact and easy-to-assemble unit results.

For all the embodiments described, it can be useful if the support member is formed as a tubular element substantially coaxial with the inner protective tube, with tubular element radially outwardly contains and supports the support pad(s).

Further, the inner protective tube and/or the support member can be made integrally with the pipe which, in some cases will avoid assembly of terminal components or flanges.

Still further, it can be advantageous that the inner protective tube is formed of two tubular segments which are nested and axially slidable. The nested end of each segment can be provided with an annular ridge. In this manner, a load bearing telescopic connection with stops for the axial motion can be provided inside the conduit element, which increases the freedom of motion of the overal connection without detracting from the compactness of the support pads. A substantially greater axial movability of the pipes with respect to each other is allowed than would be possible with just the range of motion permitted by the support pads.

It can be advantageous that the segment connected to the pipe nests within the other segment and has beyond its annular ridge an extension covering the other segment, which extends within the support pads and provides them with additional protection against heat radiating from within.

Further, in all the aforementioned embodiments, at least two support pads are arranged next to one another and are held in axial position by a radial bulge of the inner protective tube projecting between them or by the support member. This structure is to be generally used, since the axial forces arising act in both directions and must be countered by support in both directions for the pads.

The free end or free ends of the support member may be turned radially inward toward the inner protective tube as axial stops for the adjacent support pads, and it can be useful to provide cutouts in the longitudinal direction of the support member to ease the bending of the ends. Clearly, the cutouts cannot so weaken the cross-section of the support member that its radial containment function for the support pads is jeopardized.

Conversely, in corresponding cases the free ends of the inner protective tube can be turned outward toward the support member to provide axial stops for the support pads, so that no additional components are required for fastening the adjacent support pads.

Beyond the foregoing support pad construction, a different support pad structure can be used, which has a U-shaped radial cross-section with prongs parallel to the conduit axis, the radially outwardly disposed prong fastened to the end of the support member remote from its attached pipe, and the radially inwardly disposed prong fastened to the outer surface of the free end of the inner protective tube. Thus, the free prong ends can be gripped by flanges attached to the support member and to the inner protective tube. Multiple flanges can each extend over a circumferential segment and fit in keyed fashion with recesses in the prong ends. The flanges can be connected by welding to the respective components, or they can be integrally formed as parts of a ring placed on the inner protective tube or a corresponding hub.

This structure provides, in addition to oscillation damping and containment in the axial and radial directions also the possibility of absorbing torsion forces. In this connection, it can be useful for increased effect to provide two U-shaped support pads with their connecting base segments back-to-back, with the prong ends secured as described above.

To the extent not already provided in the foregoing, it is useful to have a heat-protective tube coaxially within the inner protective tube and extending over the length of the conduit element. This can serve to separate the inner protective tube and the components connected thereto from the heat loading of the exhaust gas, and serves particularly to protect the support pads from heat.

One can also provide that the support pads have a substantially rectangular cross-section. Thereby, the motions of the pipes can occur by deformation of the support pads, without leading to relative motions between the support pads or between the inner protective tube and the support member.

With the exception of support pads which have a U-shaped radial cross-section, there is also the possibility that the axially facing surfaces of the support pads and the contacting surfaces on the inner protective tube and/or the support member are annular, so that relative motion can occur on these pairs. The choice between the two structures discussed depends on the individual case.

A further possible form of the support pads is to so vary the axial cross-section over the circumference that the pads lock the joint against oscillation in one direction, while in a direction orthogonal thereto, tolerance for oscillation is provided. With such a support pad configuration, one can, on the basis of the specific application or use requirement, restrict or determine the motion direction or axis of freedom of the joint. It can be useful to secure against rotation a support pad which is so configured.

The support pads preferably comprise a temperature- and corrosion-resistant ceramic or metallic material in the form of fibers or steel wool, meshed, woven, pressed, or the like. One can also incorporate, at least partially, material with friction-reducing characteristics, or face with such a material, or press on such a material, in order to minimize production of squeaking noises or the like upon flexing of the joint. In addition, one can provide, depending on the individual case, that the support pad contains one or more smaller bodies having greater hardness or sturdiness than the remainder of the material, in order to specify the elastic damping characteristics in a specific direction.

DRAWING

DETAILED DESCRIPTION

Figure 1:
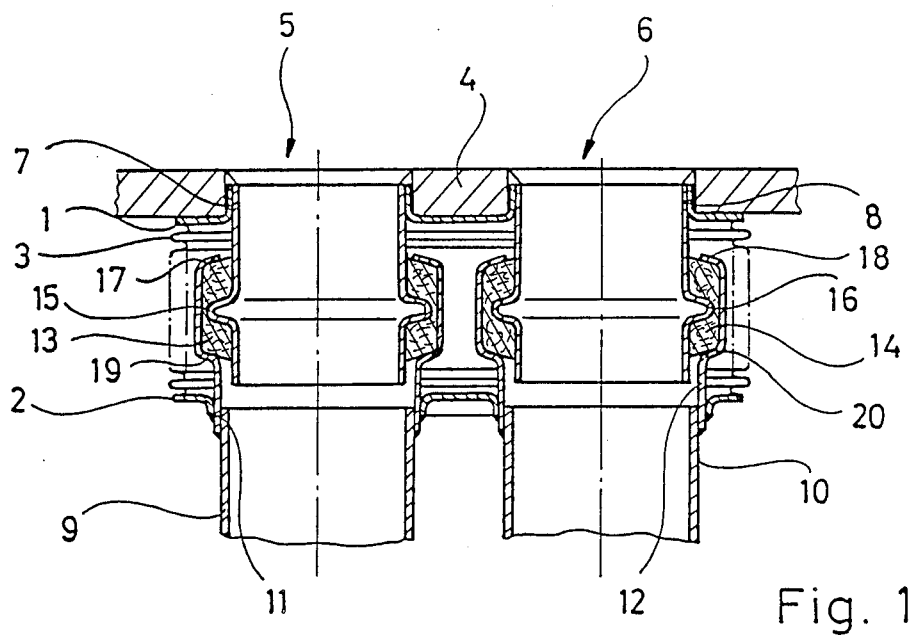
FIG. 1 is a cross-sectional side view of a two-channel jointed pipe connection.
Figure 2:
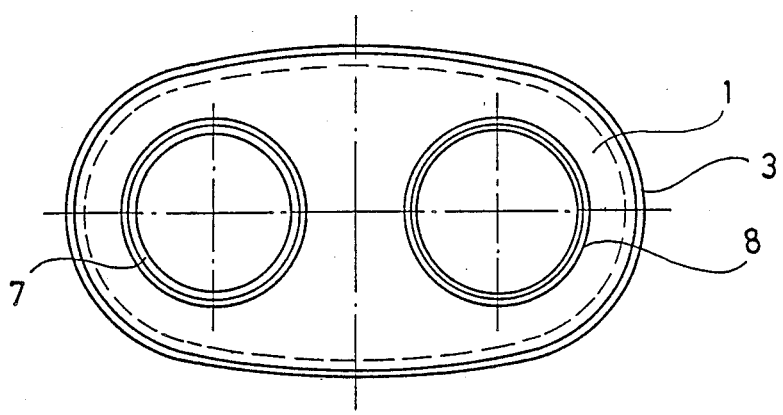
FIG. 2 is an end view of the connection structure and flange of FIG. 1.

FIGS. 1 and 2 illustrate two terminal pieces 1, 2, which are connected to each other by means of a guide element 3 in the form of an oval metal bellow having a welded-on end panel. As shown, terminal pieces 1, 2 are deep-drawn sheet metal parts. A flange plate 4 is welded to terminal piece 1. The terminal pieces 1,2 and the flange plate 4 each have two apertures for two flow paths 5,6. These flow paths are essentially defined by two inner protective tubes 7,8, welded into terminal piece 1, and are further defined beyond terminal piece 2 by two pipes 9,10 welded into terminal piece 2.

Tubular support members 11,12 are welded between pipes 9,10 and terminal piece 2 and form an outer cover along the axial extent of inner protective tubes 7,8, so that annular spaces are defined between inner protective tubes and support members 11,12. An annular support pad 13,14 is placed in each annular space. The support pads 13,14 are held in place axially on the inner protective tubes 7,8 by radially protruding corrugations 15,16 therein, which corrugations extend into the pads 13,14. The support members 11,12 radially contain the support pads 13,14 and also form circular axial contact surfaces 17,18 which support the pads 13, 14 in both axial directions.

In this manner, support pads 13,14 are secured within the annular spaces defined by the inner protective tubes 7,8 and the support member 11,12. Moreover, at the same time, inner protective tubes 7,8 are connected to the support members 11,12 and, as a result, terminal pieces 1,2 are interconnected flexibly and via support pads 13,14 in an elastically damped manner. The connection members, formed respectively by parts 7,11,13 and parts 8,12,14, for terminal pieces 1,2 assure that terminal pieces 1,2 are held in a position corresponding to the middle of guide elements 3.

As is evident from the drawings, the interior of guide element 3 is sealed, by support pads 13,14, against the gas which streams through flow paths 5,6. Further, flow paths 5 and 6 are sealed off from each other, so that exchange or commingling of their respective flowing media is prevented.

The structure depicted in FIGS. 1 and 2 is very compact, in that both flowpaths, and the components forming them, are surrounded by a common bellows 3, and no other parts are needed. The integration of the inner protective tubes 7,8 into the construction of the two connection members gives these inner protective tubes a greater utility, which obviates the need to insert additional components, since the tubes 7,8 not only define the flow paths, but also align terminal pieces 1,2 with respect to each other in an elastically damped manner.

Figure 3:
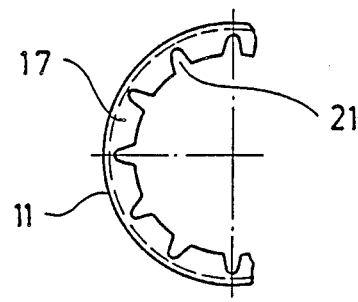
FIG. 3 is an enlarged end view showing a portion of the structure of FIG. 1 in detail.

FIG. 3 is a fragmentary front view of the contact surface 17 of support member 11, and illustrates that a plurality of spaced cutouts 21 are provided on the inner edge thereof to facilitate the radially inward rolling of surface 17. One must obviously be careful that these cutouts 21 do not so impair the stability of the contact surface 17 that it ceases to perform its function of supporting pad 13.

With reference to the description of the embodiment of FIGS. 1-3, it is in general true that each of the connection members may be considered as a single-stream conduit. Multiple terminal pieces are not necessary; rather, the conduit element can be connected directly with the inlet and outlet pipes.

The composition of the support pads is common to all of the embodiments, both already described and to be described, and preferably is a ceramic or metallic material in the form of fibers or steel wool, meshed, woven, pressed, or the like. One can also incorporate, at least partially, material with friction-reducing characteristics, in order to counteract possible squeaking noises and to increase the sturdiness of the support pad. For example, one can use graphite as a component in making the support pad. On the other hand, the support pad can contain one or more smaller bodies having greater hardness of sturdiness than the remainder of the material, permitting adjustment of the elasticity and damping characteristics to satisfy the desired specifications.

In the examples described, and in most of those to be described, the support pads have an essentially rectangular cross-section, so that they can deform and thereby absorb the motions that occur. One may also provide for curved contours between the support pads and the contact surfaces supporting them, in order to permit flexible sliding motions, where desirable.

As previously set forth, the embodiment thus far described had its connection member, including support pad, disposed completely inside the conduit element. The following description and drawings relate to embodiments in which the conduit element and the support pads are arranged axially in series with each other, without abandoning the principle of integrating the inner protective tube into the connection member.

Figure 4:
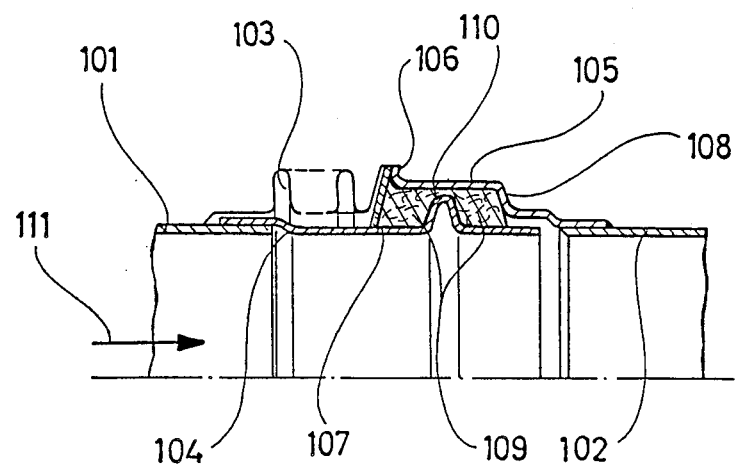
FIG. 4 is a radial cross-section of a basic element of the jointed pipe connection.

FIG. 4 is a radial cross-section through two aligned pipes 101,102. Connected to pipe 101 are a circularly corrugated conduit element 103 in the form of a bellows, and an inner protective tube 104 arranged within conduit 103. Tube 104 extends beyond conduit 103 and projects into a cylindrical support member 105 which is fastened to pipe 102. The end of conduit 103 remote from pipe 101 is connected via an angled intermediate ring 107 to the free end 106 of support member 105. At the same time, ring 107 axially closes off a chamber defined by support member 105 and its substantially radially extending flank 108.

In the chamber, two annular support pads 109 are arranged against the inner surface of support member 105 and axially contacting flank 108 and intermediate ring 107. Radial inward support for pads 109 is provided by inner protective tube 104. Axial support for pads 109 is provided by a radially outwardly projecting bulge 110 of inner protective tube 104.

Flow through the joint structure is preferably in the direction of arrow 111. By means of the structure of the present invention, pipes 101 and 102 are simultaneously connected to each other in a supporting manner and elastically angularly coupled with damping via the coupling of the inner protective tube 104 to support member 105 through support pads 109. Thus, the medium flowing in the conduit has practically no outlet through support pads 109 outwardly into the interior of conduit 103. Nevertheless, the joint structure of the invention consumes practically no more than the usual radial space, specified by conduit 103 and inner protective tube 104. An outwardly smooth cylindrical termination without projecting parts is provided.

Figure 5:
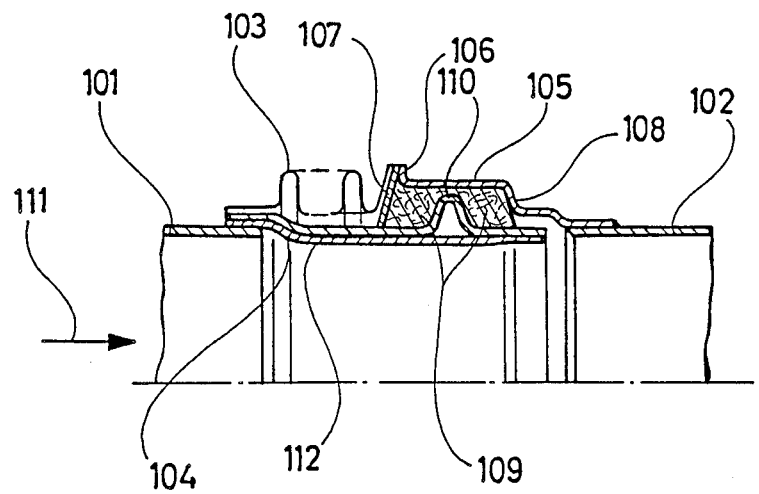
FIG. 5 is a radial cross-section of the embodiment of FIG. 1.

FIG. 5 shows a construction similar to that of FIG. 4, so reference is made to the preceding description, to the extent that the reference numerals are the same. However, a heat-protective tube 112 is additionally provided in inner protective tube 104.

Heat-protective tube 112 covers inner protective tube 104 over its entire length and serves to protect tube 104, and the components radially outward thereof, from the heat radiated by the medium being conducted therethrough.

Figure 6:
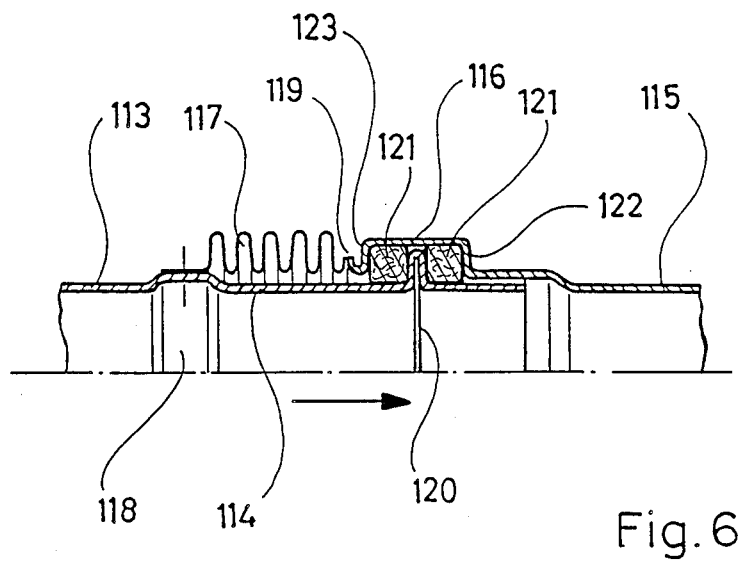
FIGS. 6-16 are simplified sectional views of further embodiments of the element of FIG. 4.

The construction of FIG. 6 corresponds in principle to that of FIG. 4, with the modification that tubular part 113 is integral with inner protective tube 114 and tubular part 115 is integral with support member 116. For easier assembly with conduit element 117, the junction between tubular part 113 and inner protective tube 114 has a radially enlarged cross-section 118. Support member 116 in this embodiment is directly connected to conduit element 117 at point 119.

Just as in the embodiment of FIG. 4, inner protective tube 114 here has a radially outwardly projecting bulge 120 for axial support of two annular support pads 121, which are engaged in the radial direction against inner protective tube 114 and support member 116, and whose axial position is bounded by two substantially radially aligned flanks 122 and 123 of support member 116.

Figure 7:
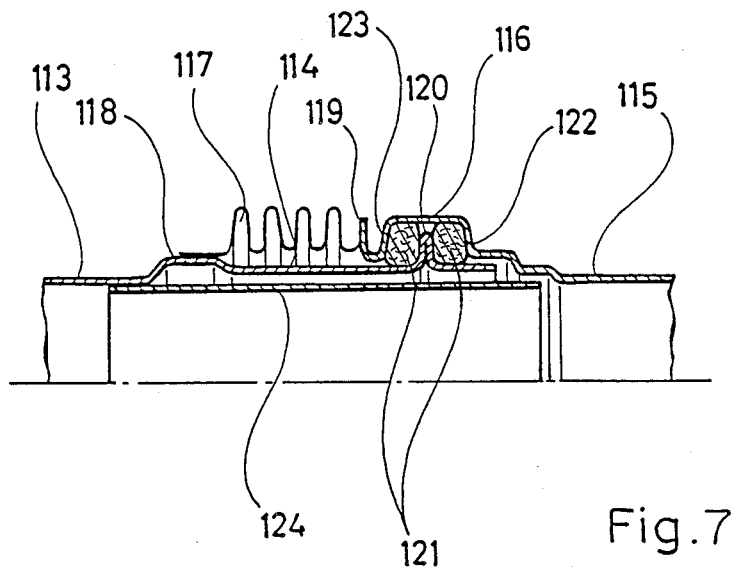

FIG. 7 illustrates an embodiment having a number of elements in common with that of FIG. 6, and reference is made to the preceding description of those elements. Additionally, however, there is provided, attached to tubular part 113, a heat-protective tube 124, which projects axially through and beyond inner protective tube 114, and which has the same purpose as the heat-protective tube 112 described above with reference to FIG. 5.

The embodiment of FIG. 8 again has two aligned pipes 125,126, but in this case, a two-part inner protective tube 127,128 is appended to pipe 125. Part 127, together with a conduit element 129, is connected to the end of pipe 125. From pipe 126 there extends, as already described with reference to FIG. 4, a support element 130 whose free end connects with the other end of conduit element 129 via an intermediate ring 131. Part 128 of the inner protective tube again has a radially outwardly directed bulge 132 for axial support of two support pads 133.

Parts 127,128 of the inner protective tube are nested, and each have an annular ridge 134,135 directed toward the other at their respective nested ends, so that they are axially slidable, one within the other, and can thus permit more axial movement between pipes 125,126 than would be possible with support pads 133 alone. Annular ridges 134,135 act as stops for the axial movement of parts 127,128 with respect to each other, and generally serve the function of maintaining the load-carrying function of the inner protective tube.

Figure 8:
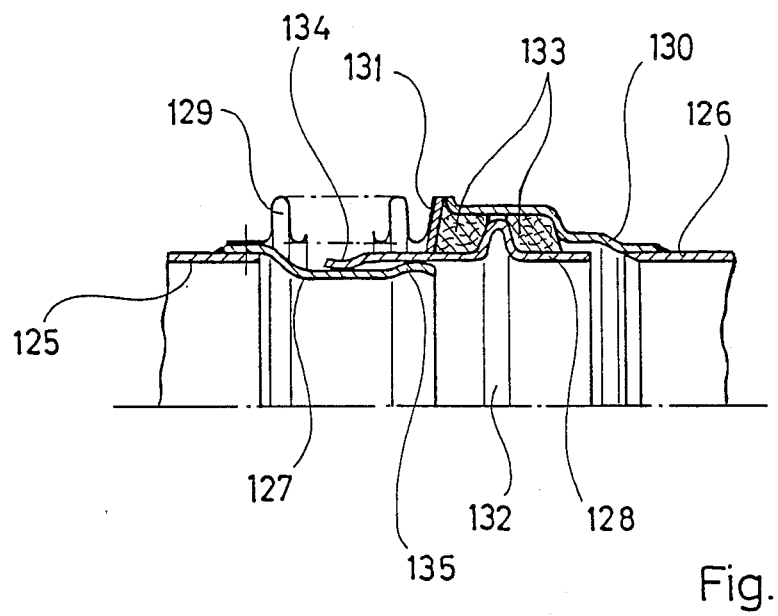
Figure 9:
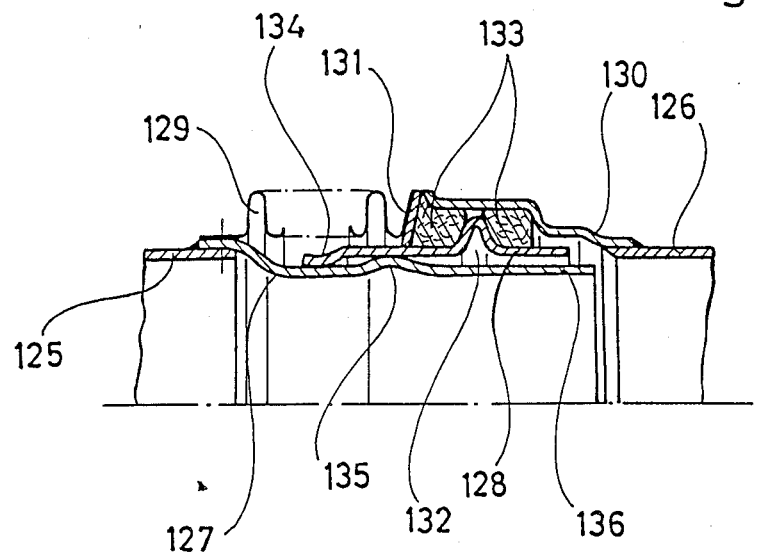

The foregoing description and reference numerals apply also for the embodiment of FIG. 9, which differs from that of FIG. 8 by having a tube segment 136 on the inside-nested part 127, which extends beyond annular ridge 135 to cover the entire length of outside-nested part 128 of the inner protective tube and provide additional heat protection therefor.

Figure 10:
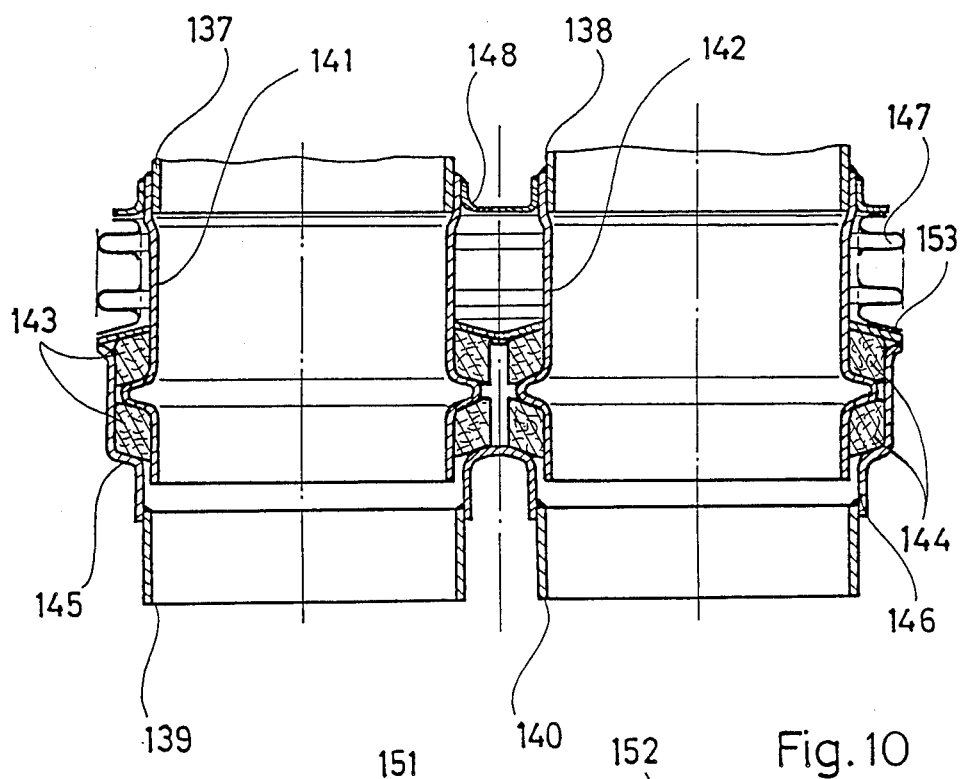

FIG. 10 illustrates a structure similar to that of FIG. 4, but having parallel or twin pipes. Pipes 137,138 on one side of the joint are connected to pipes 139,140 on the other side. From each of pipes 137,138 extends an inner protective tube 141,142, which in turn is coupled, in the manner of FIG. 1, via support pads 143,144 to support members 145,146, which in turn are fastened to pipes 139,140.

Conduit element 147 here is common to the two flow paths, and encompasses the components use to define the flow paths, principally the inner protective tubes 141,142.

Figure 11:
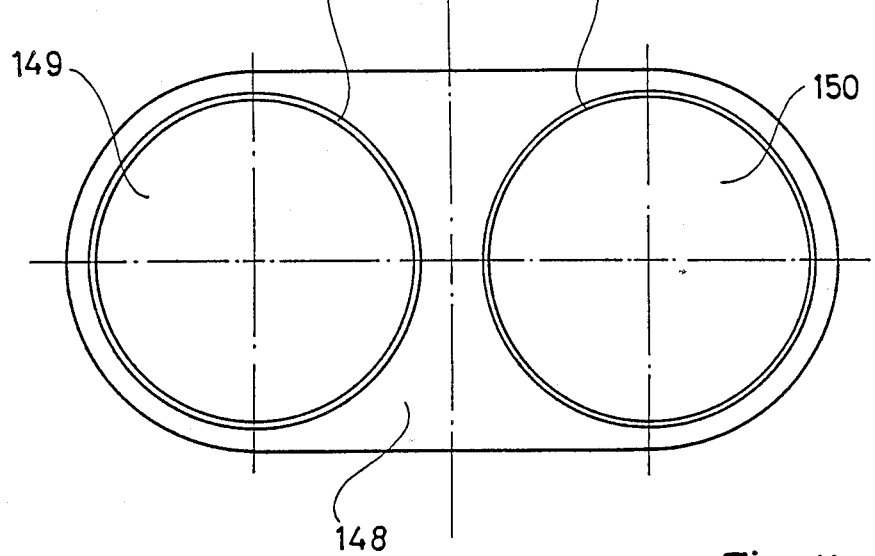

FIG. 11 illustrates a terminal or flange plate 148 which has a respective opening 149,150 for each flow path, and serves for connection of conduit element 147 with the pipes 137,138. For each opening, a respective connecting ring 151,152 is provided, between which and the respective pipe 137,138 the respective inner protective tube 141,142 is clamped and thus fastened into the common joint.

Figure 12:
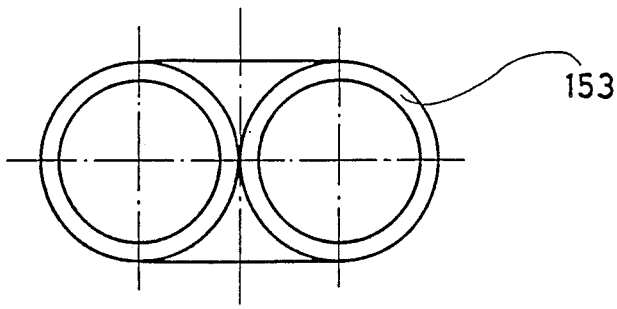

As shown in FIG. 12, a terminal plate 153 similar to terminal plate 148 is provided between conduit element 147 and support members 145,146 as axial support for the outer support pads 143,144 (see FIG. 10) and as an oval fastening surface for conduit element 147. Terminal plate 153 is also connected to the respective ends of support members 145,146 remote from pipes 139,140, i.e. The upper end as shown in FIG. 10.

Figure 13:
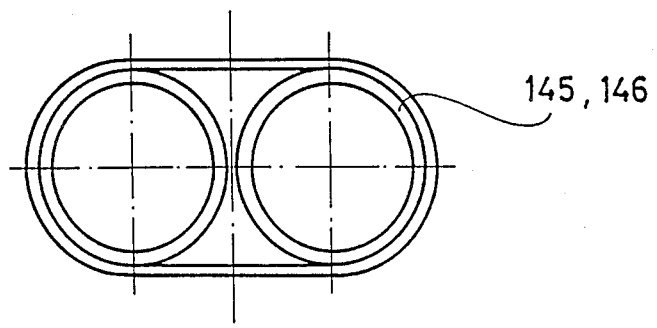

As previously noted, in the present embodiment, support members 145,146 are preferably joined into a single unit, as illustrated in the axial view of FIG. 13. They could, however, be provided as independent elements as shown in FIG. 4, and commonly covered by terminal plate 153.

FIG. 12 is an axial or plan view of terminal plate 153.

Figure 14:
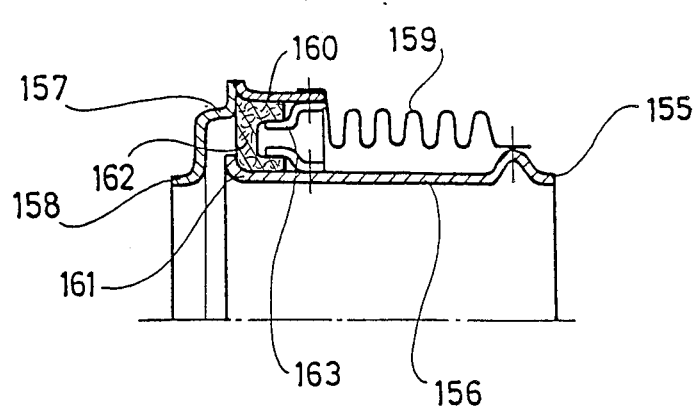
Figure 15:
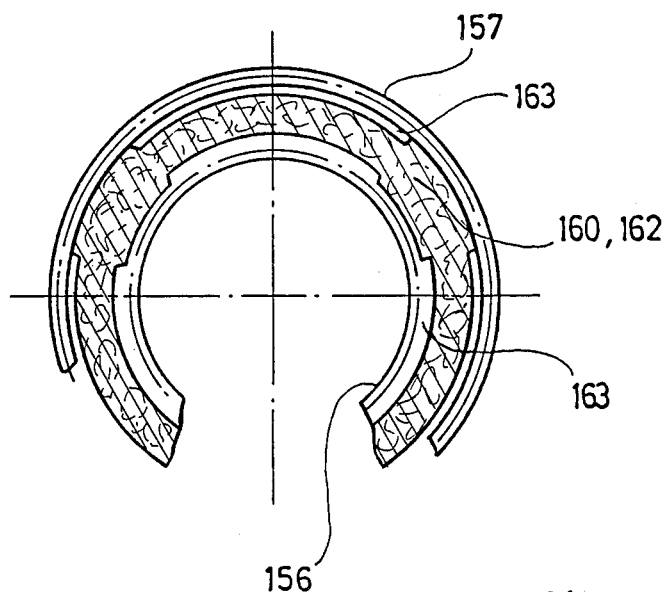
Figure 16:
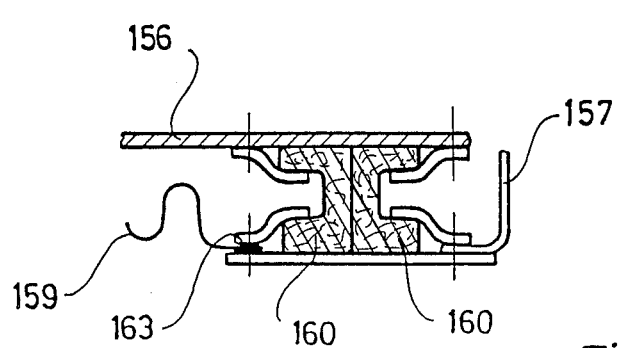

Whereas in the previously described embodiments, the support pads had a substantially rectangular cross-section, FIGS. 14–16 illustrate angled-over configurations and their mounting positions.

FIG. 14 is a radial half cross-section through a joint structure similar to that of FIG. 6, and FIG. 15 is an axial view thereof in the area of the support pads.

A pipe 155 with an integral inner protective tube 156 has a free end which projects into a support member 157, which in turn is integrally attached to a pipe 158. A conduit element 159 has two ends, one fastened to pipe 155 and the other fastened to the free end of support member 157.

A support pad 160 with a U-shaped radial cross-section is disposed between the free end of inner protective tube 156 and support member 157. The radially outwardly disposed leg or prong of the U-shaped pad 160 engages the cylindrical inner wall of support member 157, and the radially inwardly disposed leg engages the cylindrical outer surface of the free end of inner protective tube 156. Axial support for the pad 160 is provided on one side by a curved rim 161 on the free end of tube 156 and by a corresponding rim on support member 157, which engages the connecting base segment 162 of the "U" of pad 160, and on the other side by a pair of flanges 163, which grip the free ends of the legs of the U-shaped pad 160 and are respectively attached to the free end of support member 157 and to inner protective tube 156.

The axial view of FIG. 15 illustrates that flanges 163 extend only over a portion of the circumference and grip pad 160 in a keyed manner, so that, due to this connection structure, inner protective tube 156 and support member 157 are, via support pad 160, supported against torsion with respect to each other.

FIG. 16 illustrates, at an enlarged scale, a variation of the structure shown in FIGS. 14 and 15, in which two support pads 160 with U-shaped radial cross-sections are disposed with their radially aligned base segments resting against one another. As described above for one pad, the fastening of the legs of each support pad is accomplished by respective flanges to support member 157 on one side and to inner protective tube 156 on the other side.

Various changes and modifications are possible within the scope of the inventive concept, and any of the features of one embodiment may be incorporated into another of the embodiments.

We claim:

1. Jointed flexible connection for two approximately axially aligned, mutually axially movable pipes, particularly exhaust pipes (4,9,10,101,137,138; 102,139,140) of a motor vehicle, having
    at least one flexible, generally cylindrical, gas-tight, and temperature-resistant metal bellows conduit element (3,103) having a pair of ends, each of which is connected, at least indirectly, by welding to a respective one of said mutually movable pipes, thereby preventing gas leaks at said connection, and
    means for connecting the pipes (9,10,101; 102) together in a load-bearing but angularly flexible and elastically damped manner, including
        a support (11,12,105,145,146) secured to one of said pipes (9,10,102,139,140),
        an inner protective tube (7,8,104,141,142) which defines a flow path for a flowing medium (5,6) passing from one of said pipes to another of said mutually axially movable pipes, the protective tube being disposed inside the bellows conduit element (3,103) and being connected to one of said pipes (9,10,101,138; 102,139), and
        at least one resilient support pad (13,14,109,143,144) interposed radially between said inner protective tube and said support member (11,12,105,145,146),
    wherein, in accordance with the invention,
    said inner protective tube and said support member are respectively connected to different ones of said two mutually axially movable pipes;
    the inner protective tube (7,8; 104; 114; 127,128; 141,142; 156) has a free portion of its length which engages with said at least one resilient support pad (13,14; 109; 121, 133, 143, 144, 160); and
    said resilient support pad is annular, is radially contained by said support member (11, 12; 105, 116, 130, 145, 146, 157), and axially engages against at least one of said inner protective tube (7,8 . . .) and said support member.

2. Connection according to claim 1, wherein
    said support member and one end of at least one of said pipes (9,10) is disposed within said conduit element (3).

3. Connection according to claim 2, wherein (FIG. 1)
    said annular support pad (13,14) surrounds said free portion of the length of said inner protective tube (7,8).

4. Connection according to claim 1, wherein
    a plurality of terminal pieces (1,2) are provided, and define a corresponding plurality of adjacent flow paths (5,6);
    and said at least one flexible conduit element (3) commonly surrounds said flow paths and attaches to said terminal pieces.

5. Connection according to claim 4, wherein (FIG. 2)
    said conduit element (3) has a cross-sectional contour substantially corresponding to an arc enclosing said flow paths (5,6) and the pieces (1,2) defining said flow paths.

6. Connection according to claim 5, wherein (FIG. 2)
    two of said flow paths (5, 6) are provided; and
    said conduit element (3) has a cross-sectional contour which is substantially oval.

7. Connection according to claim 1, wherein (FIGS. 4–14)
    a first one of said pipes (101, 113, 125) and a second one of said pipes (102, 115, 126, 139, 140, 158) are coupled end-to-end;
    said conduit element (103, 117, 129, 147, 159) is connected to the end of said support member (105, 116, 130, 145, 146, 157) remote from said second pipe (102, 115, 126, 139, 140, 158); and
    said inner protective tube (104, 114, 127, 128, 141, 142, 156) has a length which exceeds that of said conduit element, and has a free end which projects into said support member and forms part of a flexible connection therewith.

8. Connection according to claim 7, wherein (FIG. 10)
    a plurality of adjacent flow paths are provided, and are commonly surrounded by said conduit element (147), which is coupled to a pair of pipes (137, 139; 138, 140) associated with each flow path;
    a plurality of terminal plates (148, 153), formed with openings (149, 150) for each flow path, are provided, and each plate is connected to said conduit element (147),
    one of said terminal plates (148) being connected to one end of a pipe (137, 138) of each of said pipe pairs, and
    the other (153) of each of said terminal plates (153) being connected to a free end of the support member (145, 146) associated with each flow path.

9. Connection according to claim 8, wherein (FIG. 13)
    the support members (145, 146) of all the adjacent flow paths are integrated into a single unit.

10. Connection according to claim 1, wherein said support member (11, 12; 105, 116, 130, 157) is formed as a tube coaxial with said inner protective tube (7, 8; 104; 114; 127, 128; 156).

11. Connection according to claim 1, wherein
at least one of said inner protective tuber (114, 156) and said support member (116, 157) is integrally formed with the one of said pipes (113, 115, 155, 158) associated therewith.

12. Connection according to claim 1, wherein (FIG. 8)
said inner protective tube comprises two tubular elements (127, 128), one at least partially nested within the other, axially slidable with respect to each other.

13. Connection according to claim 12, wherein (FIG. 8)
said two tubular elements (127, 128) each have an end forming part of the nested portion of said inner protective tube, and each of said nested ends is formed with an annular ridge (134,135) directed toward the other and engaging therewith.

14. Connection according to claim 13, wherein (FIG. 9)
the inside-nested one (127) of said tubular elements has an extension (136) beyond its annular ridge (135), which extension axially shields the outside-nested tubular element.

15. Connection according to claim 1, wherein (FIGS. 4–10) at least two support pads (109, 121, 133, 143, 144) are provided and are axially supported by a radial bulge (110, 120), which protrudes between them, of said inner protective tube (104, 114, 128, 141, 142).

16. Connection according to claim 1, wherein (FIGS. 6–10)
the free end of said support member (11, 12; 116) is turned radially inward toward said inner protective tube (114) as an axial stop for the adjacent support pad (13, 121).

17. Connection according to claim 1, wherein (FIG. 14)
the free end (161) of said inner protective tube (156) is turned radially outward toward said support member (157) as an axial stop for the adjacent support pad (160).

18. Connection according to claim 7, wherein (FIG. 14) said support pad (160) has a U-shaped radial cross-section with prongs parallel to the axis of said conduit element (159), the radially outwardly disposed prong being coupled to the end of said support member (157) remote from its attached pipe (158), and the radially inwardly disposed prong being coupled to the outer surface of the free end (161) of the inner protective tube (156).

19. Connection according to claim 18, wherein (FIG. 14)
a respective flange couples one of said prongs to said support member (157) and the other prong to said inner protective tube (156).

20. Connection according to claim 19, wherein (FIG. 15) a plurality of flanges (163) each extend over a circumferential segment and engage in corresponding recesses in said prongs.

21. Connection according to claim 19, wherein (FIG. 15) said plurality of flanges form part of a single annular element.

22. Connection according to claim 18, wherein (FIG. 16)
a further support pad (160) with U-shaped radial cross-section is provided, fastened between said support member (157) and said inner protective tube (156), with its prong-connecting base segment (162) resting against the base segment of the other support pad.

23. Connection according to claim 1, wherein (FIGS. 5, 7)
a heat-protective tube (112, 124) is provided, attached to one of said pipes (101, 113), and extending coaxially within said inner protective tube over the length of said conduit element (104, 114) and of said inner protective tube.

24. Connection according to claim 1, wherein
the axially facing surfaces of said support pads and the surfaces of said inner protective tubes and of said support members, engaged with said support pads, are substantially circular.

25. Connection according to claim 1, wherein
the axial cross-section of said support pads is varied such that a locking of the joint against oscillatory motions is provided in one direction, while in a direction orthogonal thereto, tolerance for oscillatory motions is maintained.

* * * * *